(12) United States Patent
VanBlon et al.

(10) Patent No.: US 9,911,415 B2
(45) Date of Patent: Mar. 6, 2018

(54) EXECUTING A VOICE COMMAND DURING VOICE INPUT

(71) Applicant: LENOVO (Singapore) PTE, LTD., New Tech Park (SG)

(72) Inventors: Russell Speight VanBlon, Raleigh, NC (US); John Carl Mese, Cary, NC (US); Nathan J. Peterson, Durham, NC (US); Rod D. Waltermann, Rougemont, NC (US); Arnold S. Weksler, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/577,853

(22) Filed: Dec. 19, 2014

(65) Prior Publication Data

US 2016/0180844 A1    Jun. 23, 2016

(51) Int. Cl.
 *G10L 21/00* (2013.01)
 *G10L 25/00* (2013.01)
 *G10L 15/00* (2013.01)
 *G10L 15/22* (2006.01)
 *H04M 3/428* (2006.01)
 *G06F 3/16* (2006.01)

(52) U.S. Cl.
 CPC ............. *G10L 15/22* (2013.01); *G06F 3/167* (2013.01); *G10L 15/222* (2013.01); *H04M 3/428* (2013.01); *G10L 2015/223* (2013.01)

(58) Field of Classification Search
 CPC . G10L 15/22; G10L 2015/223; G10L 15/222; G10L 17/22; G06F 3/167

USPC ................. 704/235, 246, 270–275
See application file for complete search history.

(56) References Cited

U.S. PATENT DOCUMENTS

| 4,704,696 | A  | * | 11/1987 | Reimer ................... G10L 15/00 704/231 |
| 6,067,521 | A  | * | 5/2000  | Ishii ........................ G10L 15/22 701/532 |
| 6,192,339 | B1 | * | 2/2001  | Cox ......................... G10L 15/30 704/270 |
| 6,212,408 | B1 | * | 4/2001  | Son ........................ H04M 1/271 379/355.01 |
| 6,963,759 | B1 |   | 11/2005 | Gerson |
| 7,260,187 | B1 | * | 8/2007  | McAllister ............ H04M 3/493 379/88.03 |
| 8,165,886 | B1 | * | 4/2012  | Gagnon .................. G10L 15/26 704/275 |
| 8,374,879 | B2 | * | 2/2013  | Falcon ..................... G10L 15/22 704/231 |
| 2001/0005411 | A1 | * | 6/2001 | Engelke .............. H04M 1/2475 379/52 |

(Continued)

*Primary Examiner* — Olujimi Adesanya
(74) *Attorney, Agent, or Firm* — Kunzler, PC

(57) ABSTRACT

Apparatuses, methods, systems, and program products are disclosed for executing a voice command during voice input. A voice module detects a voice command intended to interrupt a first voice-related task using a voice input device associated with an information handling device. A pause module pauses the first voice-related task in response to the interrupt voice command. A command module executes a second voice-related task associated with the interrupt voice command. The second voice-related task does not correct voice input received by the first voice-related task.

17 Claims, 5 Drawing Sheets

(56) References Cited

U.S. PATENT DOCUMENTS

| | | | | |
|---|---|---|---|---|
| 2003/0167174 A1* | 9/2003 | Dagtas | ............ | G11B 20/10527 |
| | | | | 704/275 |
| 2005/0267759 A1* | 12/2005 | Jeschke | .................. | G10L 15/22 |
| | | | | 704/270 |
| 2006/0259305 A1* | 11/2006 | Pietruszka | .............. | G10L 15/22 |
| | | | | 704/275 |
| 2008/0201306 A1* | 8/2008 | Cooper | ................ | H04M 3/527 |
| 2011/0125503 A1* | 5/2011 | Dong | ...................... | G10L 15/22 |
| | | | | 704/275 |
| 2012/0166184 A1 | 6/2012 | Locker et al. | | |
| 2013/0218572 A1* | 8/2013 | Cho | ........................ | G06F 3/167 |
| | | | | 704/275 |
| 2014/0142953 A1* | 5/2014 | Kim | ....................... | G10L 15/22 |
| | | | | 704/275 |
| 2014/0278444 A1* | 9/2014 | Larson | ............... | H04M 1/72522 |
| | | | | 704/275 |
| 2014/0282003 A1* | 9/2014 | Gruber | ..................... | G06F 3/16 |
| | | | | 715/727 |
| 2014/0297288 A1 | 10/2014 | Yu et al. | | |

* cited by examiner

EXECUTING A VOICE COMMAND DURING VOICE INPUT

FIELD

The subject matter disclosed herein relates to voice commands and more particularly relates to executing a voice command during voice input.

BACKGROUND

Description of the Related Art

Some information handling devices allow user interaction using speech recognition such that users can interact with an information handling device, such as a smart phone or a tablet computer, using only their voices. By using their voices, users can execute programs, input data using speech-to-text, etc., which can be helpful in situations where it is inconvenient or not possible for a user to use his hands. In some circumstances, however, when a voice-related or speech-related application is being used, such as a phone call application on a smart phone, speech recognition may be disabled, inactive, or the like such that voice commands may not be recognized during the phone conversation.

BRIEF SUMMARY

An apparatus for executing a voice command during voice input is disclosed. A method and computer program product also perform the functions of the apparatus. In one embodiment, the apparatus includes a voice input device associated with an information handling device and a processor coupled to the voice input device. In a further embodiment, a memory that stores code executable by the processor includes code that detects a voice command intended to interrupt a first voice-related task. In one embodiment, the interrupt voice command is detected using the voice input device.

In certain embodiments, the apparatus further includes code that pauses the first voice-related task in response to the interrupt voice command and executes a second voice-related task associated with the interrupt voice command. In one embodiment, the second voice-related task does not correct voice input received by the first voice-related task. In certain embodiments, the apparatus includes code that restarts the first voice-related task in response to the second-voice related task being completed. In some embodiments, the apparatus includes code that restarts the first voice-related task in response to detecting silence for a predetermined period of time during the second voice-related task.

In one embodiment, the apparatus includes code that restarts the first voice-related task in response to detecting a voice command intended to resume the first voice-related task. In some embodiments, the resume voice command is detected using the voice input device. In a further embodiment, the interrupt voice command comprises one or more of a predetermined word and a predetermined phrase. In certain embodiments, one or more of the predetermined word and predetermined phrase is associated with a second voice-related task.

In one embodiment, the first voice-related task comprises a voice call. In a further embodiment, the apparatus includes code that delays voice input associated with the voice call. In some embodiments, the apparatus includes code that provides pause feedback for the voice call in response to receiving an interrupt voice command. In one embodiment, the apparatus includes a digital signal processor (DSP) that detects the interrupt voice command. In certain embodiments, the apparatus includes code that polls for the interrupt voice command at predetermined intervals. In some embodiments, the apparatus includes code that configures the interrupt voice command in response to user input.

In one embodiment, a method includes detecting, by use of a processor, a voice command intended to interrupt a first voice-related task. In one embodiment, the interrupt voice command is detected using a voice input device. In a further embodiment, the method includes pausing the first voice-related task in response to the interrupt voice command. In another embodiment, the method includes executing a second voice-related task associated with the interrupt voice command. In one embodiment, the second voice-related task does not correct voice input received by the first voice-related task.

In one embodiment, the method includes restarting the first voice-related task in response to the second-voice related task being completed. In a further embodiment, the method includes restarting the first voice-related task in response to detecting silence for a predetermined period of time during the second voice-related task. In some embodiments, the method includes restarting the first voice-related task in response to detecting a voice command intended to resume the first voice-related task. In one embodiment, the resume voice command is detected using the voice input device.

In one embodiment, the method includes delaying voice input associated with the first voice-related task. In such an embodiment, the first voice-related task comprises a voice call. In some embodiments, the method includes receiving feedback from the second voice-related task in response to the second voice-related task being completed. In a further embodiment, the voice input device comprises one of an audible voice input device and a silent voice input device.

A program product, in certain embodiments, includes a computer readable storage medium that stores code executable by a processor. In one embodiment, the code includes detecting a voice command intended to interrupt a first voice-related task. In one embodiment, the interrupt voice command being detected using a voice input device. In a further embodiment, the code includes pausing the first voice-related task in response to the interrupt voice command. In some embodiments, the code includes executing a second voice-related task associated with the interrupt voice command. In one embodiment, the second voice-related task does not correct voice input received by the first voice-related task.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
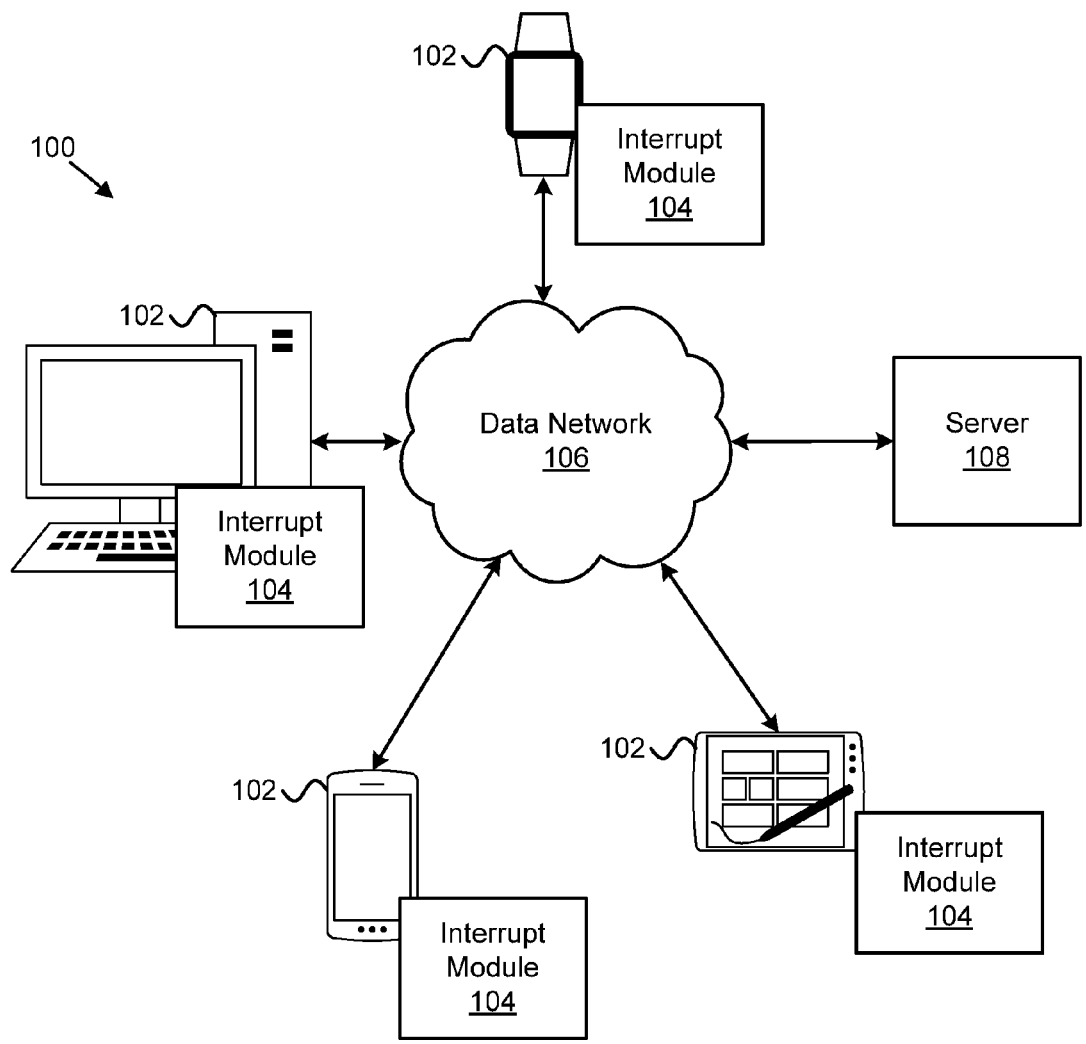
FIG. 1 is a schematic block diagram illustrating one embodiment of a system for executing a voice command during voice input.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for executing a voice command during voice input. In one embodiment, the system 100 includes information handling devices 102, interrupt modules 104, data networks 106, and servers 108. Even though a specific number of information handling devices 102, interrupt modules 104, data networks 106, and servers 108 are depicted in FIG. 1, one of skill in the art will recognize that any number of information handling devices 102, interrupt modules 104, data networks 106, and/or servers 108 may be included in the system 100.

In one embodiment, the information handling devices 102 comprise computing devices, such as desktop computers, laptop computers, personal digital assistants (PDAs), tablet computers, smart phones, smart televisions (e.g., televisions connected to the Internet), set-top boxes, game consoles, or the like. In some embodiments, the information handling devices 102 comprise wearable devices, such as smart watches, fitness bands, optical head-mounted displays, or the like. In one embodiment, the information handling devices 102 are configured to send and receive voice calls, perform voice-related tasks, recognize and process voice commands and/or other voice input, and/or the like using voice input devices coupled to the information handling devices 102. For example, a smart phone may be configured to execute phone calls, receive voice input for text messages or emails, execute one or more applications in response to a voice command, and/or the like.

As used herein, a voice input device may comprise a device configured to detect voice related input from a user. In one embodiment, a voice input device may include an audible voice input device configured to detect audible sound or speech (e.g., voices), such as a microphone. In another embodiment, a voice input device may comprise a silent voice input device configured to detect inaudible or silent speech, such as a sub-vocal recognition device, a laryngophone device (e.g., a throat microphone), an electromyography device, a camera and/or an electromagnetic device configured to detect face, mouth, lip and tongue movements, a device configured to detect non-audible murmurs, and/or the like.

The information handling devices 102, and/or the server 108, may include an embodiment of the interrupt module 104. In certain embodiments, the interrupt module 104 is configured to detect a voice command intended to interrupt a first voice-related task, such as a phone call. In certain embodiments, the interrupt module 104 is configured to pause the first voice-related task (e.g., the phone call) in response to detecting the interrupt voice command. In a further embodiment, the interrupt module 104 is configured to execute a second voice-related task associated with the interrupt voice command. In this manner, a user may interrupt an ongoing phone conversation or a voice-dictation task, for example, by speaking a predetermined interrupt word, which may execute a different voice-related task, such as adding an item to a "todo" list or performing a web search in response to words or phrases that are spoken after the interrupt voice command is received. The previous voice-related task may then be restarted, restored, or the like, after the different voice-related task is completed. In certain embodiments, the interrupt module 104 includes various modules that perform one or more of the operations of the interrupt module 104, which are described in more detail below with reference to FIG. 2.

The data network 106, in one embodiment, comprises a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, random access memory (RAM), or the like.

In one embodiment, the servers 108 include computing devices, such as desktop computers, laptop computers, mainframe computers, cloud servers, virtual servers, and/or the like. In some embodiments, the servers 108 are configured as application servers, email servers, database servers, file servers, game servers, home servers, media servers, web servers, and/or the like. In certain embodiments, the servers 108 are communicatively coupled to the information handling devices 102 via the data network such that the information handling devices 102 may store and/or access data on the servers 108 as it relates to the interrupt module 104.

Figure 2:
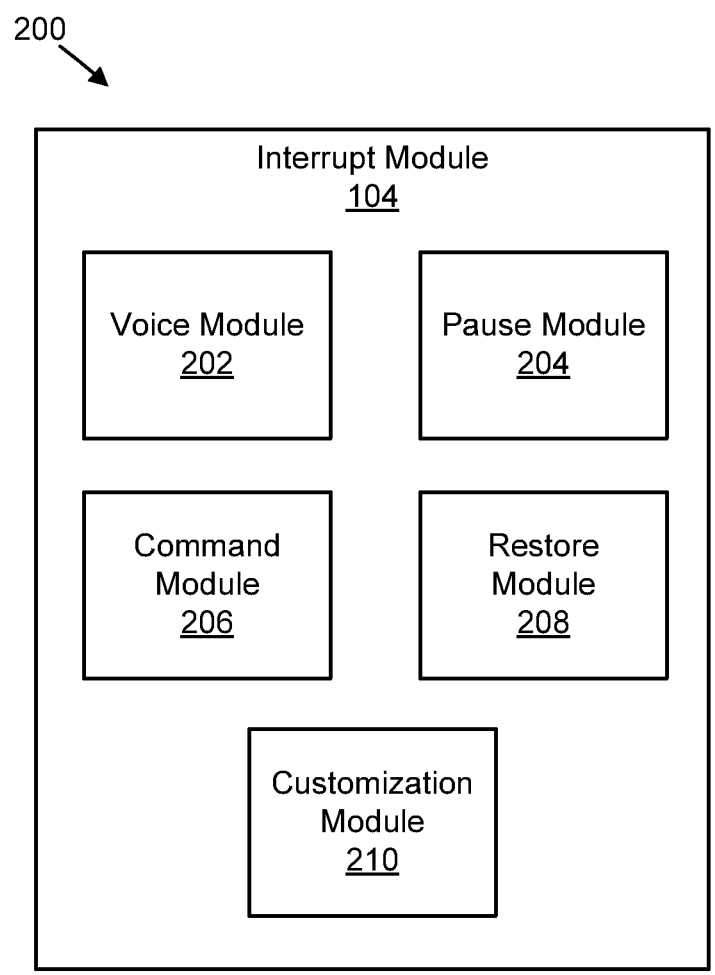
FIG. 2 is a schematic block diagram illustrating one embodiment of a module for executing a voice command during voice input.

FIG. 2 depicts one embodiment of a module 200 for executing a voice command during voice input. In one embodiment, the module 200 includes an embodiment of an interrupt module 104. The interrupt module 104, in certain embodiments, includes a voice module 202, a pause module 204, a command module 206, a restore module 208, and a customization module 210, which are described in more detail below.

In one embodiment, the voice module 202 is configured to detect a voice command intended to interrupt a first voice-related task. In certain embodiments, the voice module 202 detects a voice command using one or more voice input devices (e.g., microphones) coupled to, or otherwise in communication with, an information handling device 102. Detecting a voice command, as used herein, may refer to the recognition and translation of spoken words, using speech recognition, in order to perform a task, issue a command, execute an application, perform text-to-speech analysis, or the like.

In one embodiment, the first voice-related task comprises a voice call (e.g., a phone call), a dictation program, or the like. In certain embodiments, during execution of the first voice-related task, the voice module 202 polls, detects, or otherwise checks for an interrupt word or phrase at predefined intervals during execution of the first voice-related task. For example, the voice module 202 may check for an interrupt word or phrase every second, 500 milliseconds, or the like during a user's phone conversation or while a user is executing a voice-dictation application.

In one embodiment, the voice module 202 detects a voice command according to a predefined set of words and/or phrases that have been set aside as interrupt voice commands. For example, during a voice call, a user may speak the predefined interrupt phrase "hang on," which the voice module 202 may detect as an interrupt voice command if the phrase "hang on" has been predefined as an interrupt word. Defining words and/or phrases as interrupt voice commands will be discussed below with reference to the customization module 210.

In certain embodiments, the interrupt voice command detected by the voice module 202 is associated with a voice-related task, e.g., the voice interrupt command may also be predefined as a voice command that executes an application or performs some other task on an information handling device 102. For example, the interrupt voice command "hang on," as used in the previous example, may also be assigned to a second voice-related task, such as opening a "to-do" application, a text application, an email application, or the like. In such an example, the application associated with the interrupt voice command may be executed in response to the voice module 202 detecting the interrupt voice command such that any words spoken by the user after detecting the interrupt voice command are received by the application associated with the interrupt voice command.

In one embodiment, the voice module 202 delays voice input intended for the first voice-related task such that the first voice-related task does not receive the interrupt voice command. For example, the voice module 202 may delay voice input received by a dictation application or a voice call application such that the interrupt voice command is not received by the dictation application or the voice call application. In such an embodiment, the voice module 202 may determine how long to delay the voice input intended for the first voice-related task as a function of the length of the interrupt voice command. For example, if the interrupt voice command is only a single word, then the voice module 202 may only delay the voice input for a second or less; however, if the interrupt voice command is a phrase comprising a plurality of words, then the voice module 202 may delay the voice input for a longer period of time.

In one embodiment, the voice module 202 may be configured as an application or other software component that is configured to monitor and detect certain voice commands that have been designated as interrupt voice commands. In certain embodiments, the voice module 202 may comprise a digital signal processor, or firmware for a digital signal processor, that is configured to monitor and detect voice commands that have been designated as interrupt voice commands such that the operations of the voice module 202 are performed in hardware. In such an embodiment, configuring the voice module 202 as a digital signal processor may conserve the power of an information handling device 102, increase the efficiency of the interrupt voice command detection, and/or the like, as compared to a software embodiment of the voice module 202.

In one embodiment, the pause module 204 is configured to pause the first voice-related task in response to the interrupt voice command. For example, the pause module 204 may place a voice call on hold in response to the voice module 202 detecting an interrupt voice command during the voice call. In another example, the pause module 204 may pause or stop a dictation program in response to the voice module 202 detecting an interrupt voice command during the voice call.

In one embodiment, the pause module 204 provides feedback to the first voice-related task in response to receiving the interrupt voice command, e.g., in response to the first voice-related task being paused. For example, after pausing a voice call in response to the interrupt voice command, the pause module 204 may play a pause message, such as "I'll be right back," "Hang on for just a minute," or the like. The pause module 204 may provide other pause feedback, such as music, informative messages, or the like. In this manner, the pause module 204 provides feedback to the person on the other end of the voice call so that they are not left wondering if the call has been dropped or otherwise disconnected.

In one embodiment, the command module 206 executes a second voice-related task associated with the interrupt voice command. In certain embodiments, the interrupt voice command is assigned to or otherwise associated with a second voice-related task such that the command module 206 executes the second voice-related task in response to the interrupt voice command. For example, the command module 206 may execute an email application in response to the interrupt voice command "hold on," being assigned to the email application. In certain embodiments, the second voice-related task does not correct voice input received by the first voice-related task. For example, if the first voice-related task is a dictation application, the second voice-related task would not comprise a correction feature or function of the dictation application to correct a previously spoken word, phrase, sentence, etc., when a predefined word/phrase is received as voice input, such as "correct that," "spell that," or the like.

In some embodiments, the command module 206 executes a second voice-related task as a function of one or more words/phrases being received after the interrupt voice command is detected. For example, the voice module 202 may detect the interrupt voice command "just a minute," which may trigger the command module 206 to detect one or more words, phrases, commands, keywords, or the like that are associated with a second voice-related task. Thus, the user may say "hang on . . . send a text to . . . ," so that the voice module 202 may detect the interrupt voice command "hang on," and the command module 206 may execute a text application in response to "send a text to . . . " received after the interrupt voice command is received.

In one embodiment, the restore module 208 restarts, restores, resumes, or the like the first voice-related task. In one embodiment, the restore module 208 restores the first voice-related task in response to the second voice-related task being completed. For example, if the second voice-related task comprises sending a text via a text messaging application, the restore module 208 may resume the first voice-related task in response to the text message being sent. Likewise, the second voice-related task may comprise a sending an email via an email application or adding an event to a calendar using a calendar application. In such embodiments, the restore module 208 restarts the first voice-related in response to the email being sent or the event being added to the calendar.

In one embodiment, the restore module 208 provides feedback, to a user, an information handling device 102, or the like, in response to the second voice-related task being completed. The feedback may comprise a message (voice or text), haptic feedback (tactile feedback that recreates the sense of touch by applying forces, vibrations, or motions), sounds (e.g., beeps or tones), or the like. In this manner, the restore module 208 may resume the first voice-related task before the second voice-related task is completed, and then alert the user when the second voice-related task is finished.

For example, a co-worker who is talking to a user on the phone may tell the user that he cannot make a scheduled meeting later that day. While still speaking to the co-worker, the user may speak the interrupt voice command, which may be detected by the voice module 202, and may trigger the pause module 204 to place the co-worker on hold while the user tries to reschedule the meeting. The command module 206 may execute a calendar application associated with the interrupt voice command, or in response to another voice command received after the interrupt voice command.

While the calendar application is searching for a time to reschedule the meeting that is convenient for all of the parties involved in the meeting, the restore module 208 may resume the phone call with the co-worker. After a period of time, the calendar application may have found a day and time to reschedule the meeting, and the restore module 208 may alert the user, by vibrating the phone or sounding a beep, that the calendar application has finished. The user may then provide an interrupt voice command to place the co-worker on hold, review the information, and confirm or reschedule the suggested meeting time.

In one embodiment, the restore module 208 resumes the first voice-related task in response to detecting silence for a predetermined period of time during the second voice-related task, which may be an indication that the user is done with the second voice-related task. For example, the restore module 208 may restart the first voice-related task in response to detecting silence for one second after a user provides voice input for a text message. The amount of time that the restore module 208 detects silence before returning to the first voice-related task may be configurable by the user, by the second voice-related application, or the like.

In one embodiment, the restore module 208 restarts the first voice-related task in response to the voice module 202 detecting, receiving, or the like, a resume voice command, which may comprise a word or phrase intended to resume the first voice-related task. The resume voice command, in certain embodiments, may comprise a word or phrase such as "resume," "return," "done," or the like. In some embodiments, the resume voice command may end execution of the second voice-related task before resuming the first voice-related task. For example, in response to the voice module 202 detecting the resume voice command "resume," the command module 206 may cease the execution of the second voice-related task, such as a calendar application, and the restore module 208 may restart or resume the first voice-related task.

In one embodiment, the customization module 210 is configured to configure, customize, or the like the interrupt voice command and/or the resume voice command in response to user input. For example, the customization module 210 may designate words or phrases as specified by the user to be interrupt voice commands, such as "hold on," "wait a minute," "be right back," "hang on," or the like. In another example, the customization module 210 may designate words or phrases as specified by the user to be resume voice commands, such as "resume," "return," "done," "finished," or the like.

In one embodiment, the customization module 210 associates or assigns one or more applications, tasks, programs, or the like with an interrupt voice command. For example, the customization module 210 may assign an email application to the phrase "be right back," or a text messaging application to the phrase "hold on." The customization module 210 may generate one or more associations or assignments in response to user input. For example, the customization module 210 may create an assignment or association in response to the user saying an interrupt voice command and selecting an application, program, task, or the like to associate with the interrupt voice command.

Figure 3:
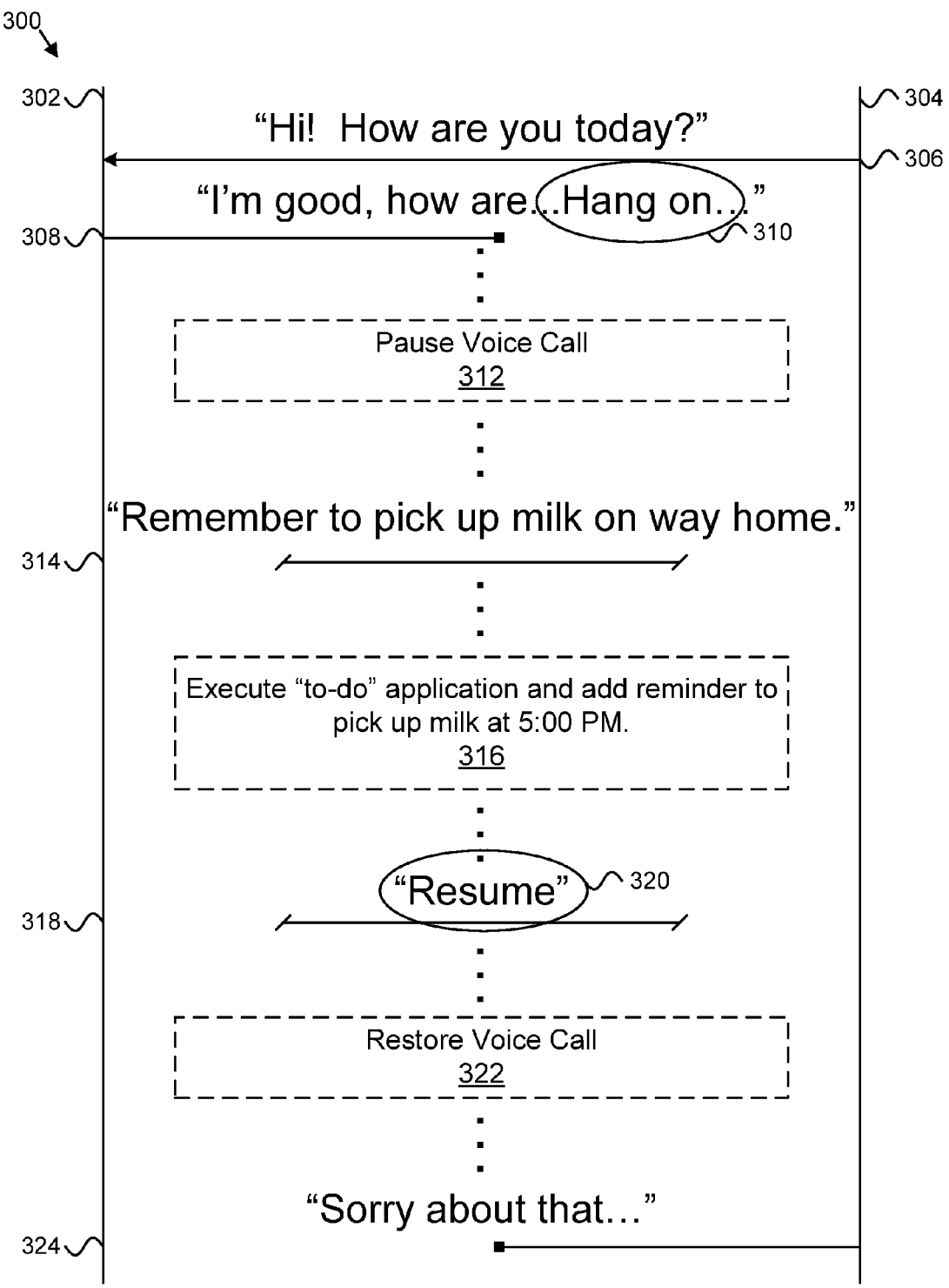
FIG. 3 is a schematic block diagram illustrating an example embodiment of executing a voice command during voice input.

FIG. 3 depicts an example embodiment 300 of executing a voice command during voice input. In the depicted embodiment, a user 302 may be having a phone conversation with a different user 304. The different user 304 may begin the conversation with an introductory statement 306, such as "Hi! How are you today?" The user 302 may begin the reply 308 with "I'm good. How are . . . ," but before the user 302 can finish his statement 308, the user 302 may remember that he needs to pick up milk on his way home. So, the user 302 may proceed to speak the interrupt voice command 310, "hang on."

In one embodiment, the voice module 202 may receive the interrupt voice command 310, and the pause module 204, in response to receiving the interrupt voice command 310, may pause 312 the voice call with the different user 304. The user 302 may then proceed to add an item to his calendar or "to-do" app by speaking the item 314 to add, such as "Remember to pick up milk on the way home." In response to the user's statement 314, the command module 206 may execute 316 the calendar or "to-do" application (e.g., the second voice-related task), which may add a reminder for the user 302 to pick up mile at 5:00 PM.

In order to return to the phone call, the restore module 208 may detect a resume voice command 318, such as the word or phrase "resume" 320 and the restore module 208 may restore 322 the phone call in response to the resume voice command 318. The user 302 may then continue his conversation 324 with the different user 304 (e.g., "Sorry about that . . . ").

Figure 4:
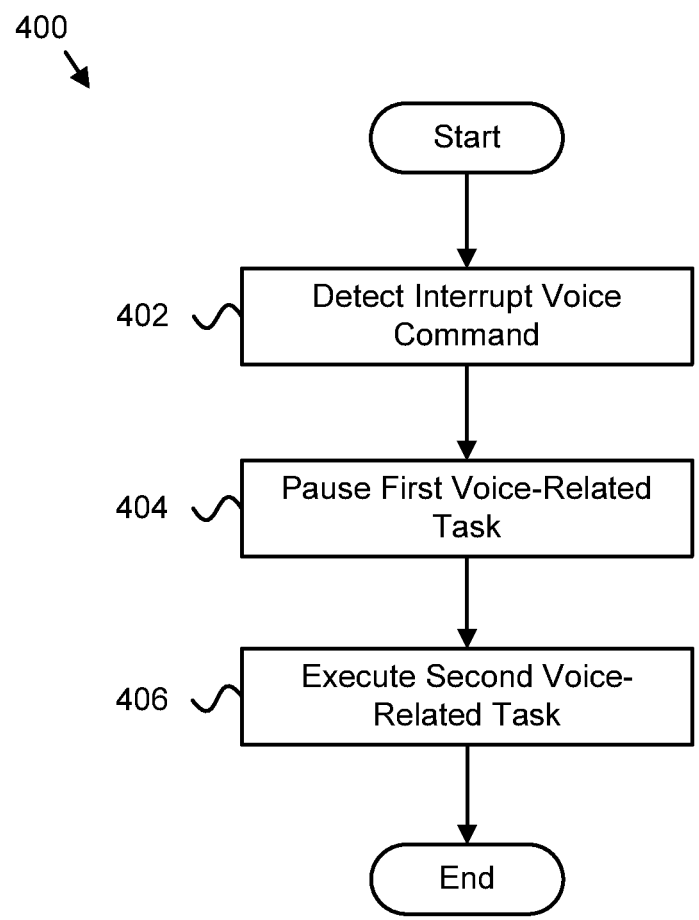
FIG. 4 is a schematic flow chart diagram illustrating one embodiment of a method for executing a voice command during voice input.

FIG. 4 is a schematic flow chart diagram illustrating one embodiment of a method 400 for executing a voice command during voice input. In one embodiment, the method 400 begins and the voice module 202 detects 402 a voice command intended to interrupt a first voice-related task using a voice input device (e.g., a microphone) associated with an information handling device 102. The pause module 204, in one embodiment, pauses 404 the first voice-related task in response to the interrupt voice command. In certain embodiments, the command module 206 executes 406 a second voice-related task associated with the interrupt voice command, and the method 400 ends.

Figure 5:
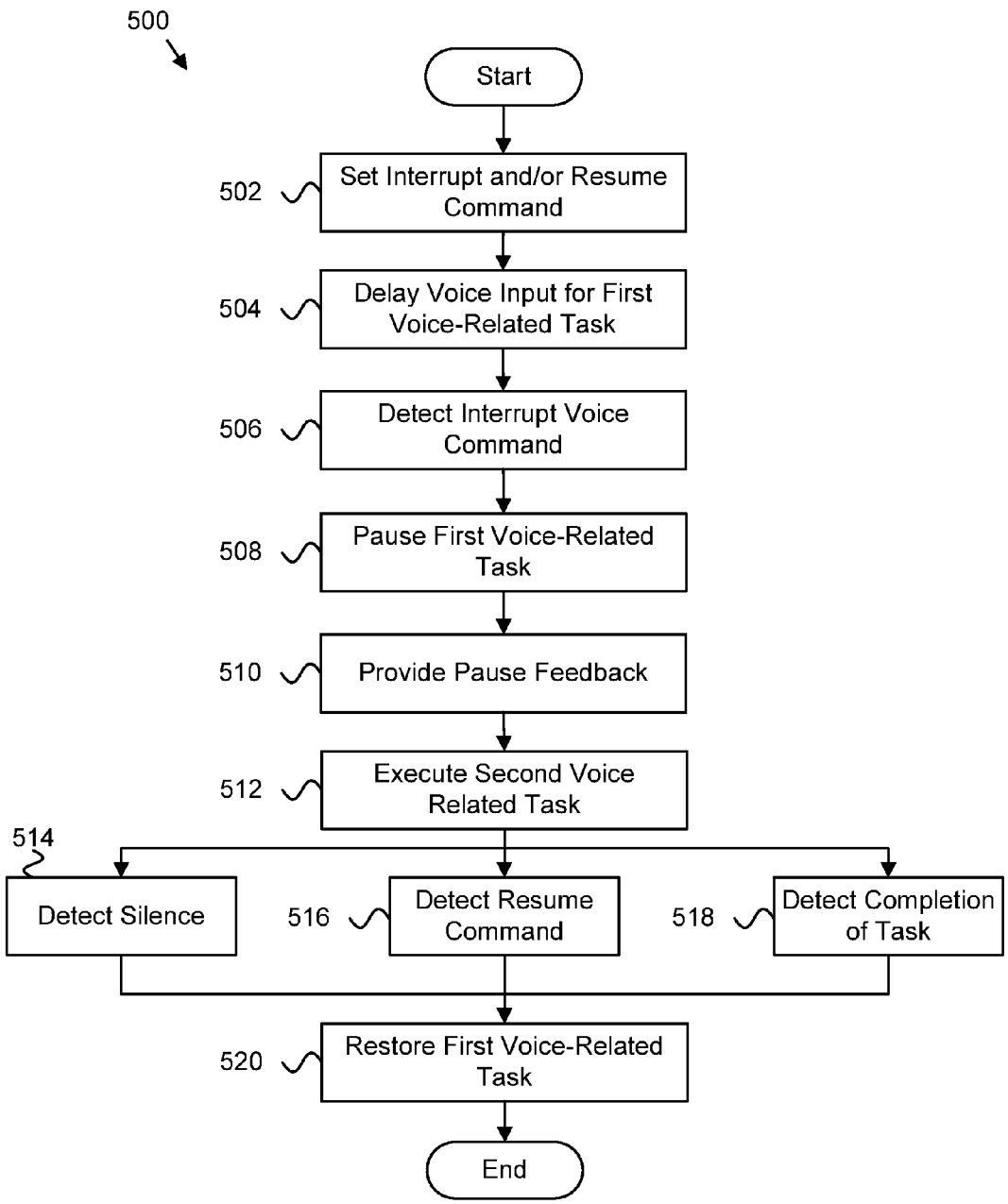
FIG. 5 is a schematic flow chart diagram illustrating one embodiment of another method for executing a voice command during voice input.

FIG. 5 is a schematic flow chart diagram illustrating one embodiment of another method 500 for executing a voice command during voice input. In one embodiment, the method 500 begins and a customization module 210 sets 502 the interrupt voice command and/or the resume voice command in response to user input. For example, the customization module 210 may receive voice input such as "hang on," "wait a minute," "be right back," or the like as an interrupt voice command. Similarly, the customization module 210 may receive voice input such as "resume," "return," "done," or the like as a resume voice command.

In one embodiment, the voice module 202 delays 504 voice input for a first voice-related task, such as a phone call or a dictation application, such that the interrupt voice command is not received by the first voice-related task. The voice module 202 may delay 504 the voice input for a predetermined number of milliseconds, seconds, or the like. In a further embodiment, a voice module 202 detects 506 an interrupt voice command, and the pause module 204 pauses 508 the first voice-related task in response to the interrupt voice command. For example, the pause module 204 may place a phone call on hold, may pause a dictation application, or the like.

In some embodiments, the pause module 202 provides 510 pause feedback, such as informative messages, music, or the like, to the first voice-related task. For example, the pause module 202 may provide 510 a message to one or more parties of a phone call to inform the parties that the user will be right back. In this manner, the other parties are informed that the user is still on the line, but is just away from the phone for a bit.

In one embodiment, the command module 206 executes 512 a second voice-related task in response to the interrupt voice command. For example, the command module 206 may execute a calendar application, an email or text application, or the like. The restore module 208, in one embodiment, restores 520 the first voice-related task in response to detecting 514 silence during execution of the second voice-related task for a predetermined amount of time, which may indicate that the user is done with the second voice-related task.

In a further embodiment, the restore module 208 restores 520 the first voice-related task in response to detecting 516 a resume voice command, such as "resume," "restore," "done," or the like. In some embodiments, the restore module 208 restores 520 the first voice-related task in response to detecting 518 completion of the second voice-related task, such as if a dictated text or email is successfully sent, or the like, and the method 500 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a voice input device associated with an information handling device;
a processor coupled to the voice input device;
a memory that stores code executable by the processor, the code comprising:
code that detects a voice command spoken by a first user during a first voice-related task performed by the first user on the information handling device, the voice command intended to interrupt the first voice-related task, the interrupt voice command detected using the voice input device, the first voice-related task comprising a voice call application for communicating with a second user, wherein delivery of input provided by the first user to the voice call application during a conversation with the second user is delayed by a predetermined amount of time;
code that pauses the first voice-related task in response to the first user speaking the interrupt voice command during the conversation with the second user such that the interrupt voice command is not received by the voice call application due to the delayed delivery of the input to the voice call application; and
code that executes a second voice-related task associated with the interrupt voice command on the information handling device, the second voice-related task automatically executed in response to the first voice-related task being paused, the second voice-related task not correcting voice input received by the first voice-related task.

2. The apparatus of claim 1, further comprising code that restarts the first voice-related task in response to the second-voice related task being completed.

3. The apparatus of claim 1, further comprising code that restarts the first voice-related task in response to detecting silence for a predetermined period of time during the second voice-related task.

4. The apparatus of claim 1, further comprising code that restarts the first voice-related task in response to detecting a voice command intended to resume the first voice-related task, the resume voice command being detected using the voice input device.

5. The apparatus of claim 1, wherein the interrupt voice command comprises one or more of a predetermined word and a predetermined phrase.

6. The apparatus of claim 5, wherein one or more of the predetermined word and predetermined phrase is associated with a second voice-related task.

7. The apparatus of claim 1, further comprising code that provides pause feedback for the voice call in response to receiving an interrupt voice command.

8. The apparatus of claim 1, further comprising a digital signal processor (DSP) that detects the interrupt voice command.

9. The apparatus of claim 1, further comprising code that polls for the interrupt voice command at predetermined intervals.

10. The apparatus of claim 1, further comprising code that configures the interrupt voice command in response to user input.

11. A method comprising:
  detecting, by use of a processor, a voice command spoken by a first user during a first voice-related task performed by the first user on the information handling device, the voice command intended to interrupt the first voice-related task, the interrupt voice command detected using the voice input device, the first voice-related task comprising a voice call application for communicating with a second user, wherein delivery of input provided by the first user to the voice call application during a conversation with the second user is delayed by a predetermined amount of time;
  pausing the first voice-related task in response to the first user speaking the interrupt voice command during the conversation with the second user such that the interrupt voice command is not received by the voice call application due to the delayed delivery of the input to the voice call application; and
  executing a second voice-related task associated with the interrupt voice command on the information handling device, the second voice-related task automatically executed in response to the first voice-related task being paused, the second voice-related task not correcting voice input received by the first voice-related task.

12. The method of claim 11, further comprising restarting the first voice-related task in response to the second-voice related task being completed.

13. The method of claim 11, further comprising restarting the first voice-related task in response to detecting silence for a predetermined period of time during the second voice-related task.

14. The method of claim 11, further comprising restarting the first voice-related task in response to detecting a voice command intended to resume the first voice-related task, the resume voice command being detected using the voice input device.

15. The method of claim 11, further comprising receiving feedback from the second voice-related task in response to the second voice-related task being completed.

16. The method of claim 11, wherein the voice input device comprises one of an audible voice input device and a silent voice input device.

17. A program product comprising a non-transitory computer readable storage medium that stores code executable by a processor, the executable code comprising code to perform:
  detecting a voice command spoken by a first user during a first voice-related task performed by the first user on the information handling device, the voice command intended to interrupt the first voice-related task, the interrupt voice command detected using the voice input device, the first voice-related task comprising a voice call application for communicating with a second user, wherein delivery of input provided by the first user to the voice call application during a conversation with the second user is delayed by a predetermined amount of time;
  pausing the first voice-related task in response to the first user speaking the interrupt voice command during the conversation with the second user such that the interrupt voice command is not received by the voice call application due to the delayed delivery of the input to the voice call application; and
  executing a second voice-related task associated with the interrupt voice command on the information handling device, the second voice-related task automatically executed in response to the first voice-related task being paused, the second voice-related task not correcting voice input received by the first voice-related task.

* * * * *